(12) United States Patent
Wadman

(10) Patent No.: US 6,451,387 B1
(45) Date of Patent: *Sep. 17, 2002

(54) METHOD OF APPLYING A CERAMIC LAYER TO AN UNDER-LAYER HAVING RELATIVELY LOW MELTING TEMPERATURE

(75) Inventor: Sipke Wadman, Eindhoven (NL)

(73) Assignee: Koninklijke Philips Electronics N.V., Eindhoven (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/261,847

(22) Filed: Mar. 3, 1999

(30) Foreign Application Priority Data

Mar. 5, 1998 (EP) .............................. 98200685

(51) Int. Cl.$^7$ .............................. B05D 3/06; B05D 5/00; C08J 7/06
(52) U.S. Cl. ........................ 427/554; 427/557; 427/559
(58) Field of Search ................................ 427/554, 555, 427/557, 558, 559, 596, 597

(56) References Cited

U.S. PATENT DOCUMENTS

| | | | | |
|---|---|---|---|---|
| 5,132,248 A | * | 7/1992 | Drummond et al. | 427/555 |
| 5,143,533 A | | 9/1992 | Brusasco | 65/18.1 |
| 5,492,769 A | | 2/1996 | Pryor et al. | 428/552 |
| 5,851,335 A | * | 12/1998 | Budnik et al. | 427/555 |

OTHER PUBLICATIONS

R.J. Lewis, et al., *Hawley's Condensed Chemical Dictionary*, Van Nostrand Reinhold Comp., N.Y., excerpt pp. 1073,300–301, 1993 no month.*

* cited by examiner

*Primary Examiner*—Marianne Padgett
(74) *Attorney, Agent, or Firm*—Ernestine C. Bartlett

(57) ABSTRACT

In a method of applying a ceramic layer to an under-layer having a relatively low melting temperature, in particular a synthetic resin under-layer, particles of a ceramic material are provided on such an under-layer and, by heating, a mechanical bond between ceramic particles and the under-layer is brought about. By means of a laser device, a temperature is generated, for a time of the order of or shorter than the melting time of the under-layer, which is at least effective to obtain mutual compacting and/or sintering of the ceramic particles.

8 Claims, No Drawings

METHOD OF APPLYING A CERAMIC LAYER TO AN UNDER-LAYER HAVING RELATIVELY LOW MELTING TEMPERATURE

BACKGROUND OF THE INVENTION

The invention relates to a method of applying a ceramic layer to an under-layer having a relatively low melting temperature, in particular a synthetic resin under-layer, whereby particles of a ceramic material are provided on such an under-layer, and a mechanical bond between ceramic particles on the one hand and the under-layer on the other hand is brought about by heating.

Such a method is known from U.S. Pat. No. 5,492,769. In the method described in said document, a synthetic resin under-layer provided with ceramic particles is heated to above the GTT (glass transition temperature), which is the temperature range in which the behavior of the material ranges between an elastic state and a viscous state, said synthetic resin under-layer being heated to a temperature at which melting phenomena occur only at the surface of the synthetic resin under-layer and at which the ceramic particles are embedded, so that, upon curing, these particles are mechanically bonded to the synthetic resin under-layer. In this manner, the surface of a synthetic resin product can be modified such that the mechanical properties of the product, in particular the frictional properties, can be influenced, i.e. improved, substantially.

However, this known method does not enable a ceramic layer to be applied to a synthetic resin under-layer in such a way that mutual bonding of the ceramic particles also takes place, which is important if the synthetic resin under-layer must be covered completely or substantially completely. Although it would be possible to replace metal by high-grade synthetic resins at locations where the material is subject to heavy mechanical loads, these high-grade synthetic resins also have a limited mechanical resistance. As regards components which are subject to wear or other mechanical influences, or whose optical properties, in connection with the visual impression, such as the outside of apparatus, are important, these high-grade synthetic resins do not provide a satisfactory solution either.

SUMMARY OF THE INVENTION

Therefore, it is an object of the invention to provide inexpensive synthetic resins or, possibly, other materials having a relatively low melting temperature with a coating, which causes these substances and materials to become highly resistant to all sorts of mechanical influences, so that, for example, the scratch resistance of surfaces is improved, knives remain sharp for a longer period of time, etc.

In order to be able to apply a ceramic layer to an under-layer having a relatively low melting temperature, the method, as described in the opening paragraph, is characterized in that a laser device is used to generate, during a period of time of the order of or shorter than the melting time of the under-layer, a temperature which is at least so high that in addition compacting or sintering of the ceramic particles is achieved. It has been found that, in this manner, a temperature required for compacting or sintering can be generated by heating with a laser pulse for a short period of time, without the under-layer melting completely or exceedingly. Therefore, sintering in an oven is impossible. A pulse-laser device, however, enables the material used to be heated for a short period of time at an accurately defined location and to an accurately defined depth. Dependent upon the composition of the ceramic material and the size of the ceramic particles, the temperature required for sintering ranges from approximately 800 to 1400° C. In such a method, the particle size may vary from 1 to 1000 nm; for this reason, the particles are referred to as nanoparticles. As the particles are smaller, the sintering temperature is lower and the sintering time is shorter, and a better sintering result is achieved. If the ceramic material is heated further, in the manner described above, and subsequently cooled rapidly, partial compacting or sintering may occur. In addition, bonding of the particles will take place as a result of flow phenomena; this is an amorphous state at the surface of the particles. In the case of sintering, the crystalline structure of the ceramic layer is preserved. Crystalline coalescence of the particles takes place, while cavities between the particles remain; mass transport caused by diffusion occurs, whereby the relatively large particles coalesce at the expense of the smaller particles. This phenomenon is also referred to as "neck" formation.

The provision of a ceramic layer by means of a laser device is known per se from U.S. Pat. No. 5,143,533. In said document, the particles are provided as a sol-gel colloid on an under-layer which is resistant to high temperatures, so that the problems which are inherent to the use of an under-layer having a relatively low melting temperature, such as a synthetic resin under-layer, do not occur. Moreover, in accordance with said patent document, the ceramic particles are heated in such a manner that an amorphous glassy layer is formed. In the method described in said patent document, use is further made of the laser device to achieve a heating time of several seconds, which is much too long if the under-layer has a relatively low melting temperature, for example of the order of 120 to 200° C. In view of the melting time of the under-layer, the heating time should be of the order of nanoseconds to microseconds.

In accordance with the invention, sintering of ceramic particles without completely or excessively melting the under-layer is possible, in particular, if the energy generated by the laser device is focused on the ceramic particles provided on the under-layer, and the wavelength of said laser device is adjusted to the energy-absorption power of the ceramic particles.

If, as a result of the choice of the ceramic material, the energy-absorption power is insufficient, additional ceramic particles having relatively strong energy-absorbing properties can be added thereto. Of course, it is alternatively possible to add other substances having such strong energy-absorbing properties; these substances may also be volatile or burn in the course of the process. In general, the additionally added ceramic particles are larger than the particles to be sintered; the larger particles are surrounded by sintered smaller particles. Said larger particles may exhibit a change in structure; a so-called viscous sintering occurs. As mentioned above, the strong energy absorption in the ceramic layer causes this layer to be heated such that sintering occurs in said layer. As a result of conduction, the heat penetrates through the ceramic layer and heats the under-layer, thereby causing it to melt at the surface. The sintered ceramic layer is still slightly porous, so that enormous capillary pressures develop which cause the melted substance of the under-layer to penetrate the pores. This results in a more or less closed ceramic top layer which is mechanically anchored to the under-layer. A further chemical bond is not necessary.

In accordance with another embodiment of the method of providing an under-layer having a relatively low melting temperature with a sintered ceramic layer, the energy generated by the laser device is focused onto the surface layer of the under-layer, and the wavelength of the laser device is adjusted to the absorption power of the under-layer, the ceramic particles being incorporated in the melted surface layer of the under-layer, and, after solidification of the substance of the under-layer and providing a further layer of ceramic particles, a sintering process is carried out. This further layer of ceramic particles may of course be provided with one or more layers of sintered ceramic particles.

For the under-layer, use is preferably made of a synthetic resin (a thermoplast or thermosetter); the most eligible synthetic resins are the cheapest and also relatively soft plastics such as polypropylene ("PP") or polyethylene ("PE"). The melting temperature of such plastics is generally of the order of 120 to 200° C.

The under-layer is provided with ceramic particles, preferably so-called nanoparticles, i.e. particles having a size of the order of 1 to 1000 nm. These ceramic particles may be provided in the form of a sol-gel solution, a colloidal sol or a powder. For the ceramic material use can be made, for example, of nanoparticles of $SiO_2$, $Al_2O_3$, AlN, MgO, SiC, TiN, $ZrO_2$. This material can be used to prepare a colloidal sol or a sol-gel solution. The colloidal sol or sol-gel solution can be applied to the under-layer by means of spin coating, dip coating or printing. If necessary, the adhesion between the sol and the under-layer can be improved by means of a moistening agent and/or a surface-active substance. In practice, for example, use can be made of an $SiO_2$ sol having a particle size ranging from 20 to 50 nm, marketed under the tradename Ludox AS40, mixed, for example, with a moistening agent, marketed under the trade name Versicol E11, and, if necessary, a surface-active substance marketed under the trade name RA30, Silwet L77, Serful EA188 or Orotan 731. In this respect, it is noted that under-layers having a very low surface tension, such as PP or PE, may require a pretreatment, such as corona or flame activation, to enable a desirable moistening of the surface of the under-layer. Subsequently, by means of concentration by evaporation, a (more porous) aerogel or a (more compact) xerogel, dependent upon, inter alia, the rate at which the solvent is removed, is formed on the under-layer.

For sintering use can be made, for example, of a $CO_2$-laser having a wavelength $\lambda=10.6\,\mu m$, which is very suitable for sintering $SiO_2$ nanoparticles on a PP under-layer. This results in a substantial increase of the scratch and wear resistance of the surface. The products thus obtained can suitably be used in housings for apparatus, plastic bearings, etc. This laser can also be used to sinter a mixture of $SiO_2$ nanoparticles and $Fe_2O_3$ microparticles on a high-grade synthetic resin, such as glass-filled polyaryl amide, which is used, inter alia, for components of shavers; the sintered material can then be used, for example, for razor blades. In all cases, the setting of the power density and the pulse time of the laser must be tuned to the materials used. Dependent upon the specific application and the choice of the particle size, the thickness of the ceramic layer will be of the order of 100 nm to several microns. Instead of the above-mentioned $CO_2$ laser, use can also be made, for example, of a UV Ar/F (ArgonFluor)-laser having a wavelength $\lambda=192$ nm.

To sinter a certain surface, the laser device is made to scan this surface. For example, a reciprocating movement with an interspace, for example, of 0.2 to 0.5 mm can be performed at a velocity which may vary, for example, from several tenths to hundred m/sec. Said scanning can be carried out by controlling the laser beam by means of motor-driven rotatable mirrors. A laser device which can suitably be used in practice is the Rofin Sinar $CO_2$ laser Model RS80, designed for industrial applications, to which a Scanhead SK1010 with Scanlab RTC1000 interface card is added so that the laser beam can be controlled in two orthogonal directions. Use can also be made of such a laser device to which a rotating polygon mirror is added.

Apart from a method of providing a ceramic layer on an under-layer with a relatively low melting temperature, the invention also relates to an under-layer with a relatively low melting temperature, in particular a synthetic resin under-layer to which a ceramic layer is applied in accordance with this method, as well as to a synthetic resin product provided with a ceramic layer manufactured by means of this method.

What is claimed is:

1. A method of applying a ceramic layer to at least substantially completely cover a synthetic resin under-layer having a melting temperature in a range of about 120 to 200 degrees C., whereby particles of a ceramic material are provided on said synthetic resin under-layer, and a mechanical bond between the particles of said ceramic material, and between the particles and said under-layer is brought about by heating, wherein a laser device, capable of generating energy of a specified wavelength effective to produce a desired temperature in said under-layer, is used to generate, during a period of time of the order of or shorter than a melting time of the under-layer, the desired temperature being at least so high that in addition compacting or sintering of the particles of the ceramic material is achieved.

2. A method as claimed in claim 1, wherein the temperature is so high that the compacting or sintering that takes place is a partial compacting or partial sintering of the particles of the ceramic material.

3. A method as claimed in claim 1, wherein the energy generated by the laser device is focused on the ceramic particles provided on the under-layer, and the wavelength of said laser device is adjusted to an energy-absorption power of the particles of the ceramic material.

4. A method as claimed in claim 1, wherein additional particles are added to the ceramic material, prior to the compacting or sintering of the particles of the ceramic material to increase energy-absorption power of the ceramic material.

5. A method as claimed in claim 1, wherein said energy generated by the laser device is focused onto a surface layer of the under-layer of such quality and amount as is effective to effect a partial melting of said surface layer, and the wavelength of the laser device is adjusted to an energy-absorption power of the under-layer, the particles of the ceramic material being incorporated in the partially melted surface layer of the under-layer, and, after solidification of the under-layer, a further layer of particles of the ceramic material is provided, and the under-layer and said further layer are subjected to a sintering process.

6. A method of applying a ceramic layer to at least substantially completely cover a synthetic resin under-layer having a melting temperature in a range of about 120 to 200 degrees C., said method comprising the steps of providing a sol-gel solution, a colloidal sol or a powder of a ceramic material selected from the group consisting of $SiO_2$, $Al_2O_3$, AlN, MgO, SiC, TiN and ZrO2 on said synthetic resin under-layer, and forming a mechanical bond between the particles of said ceramic material, and between the particles and said under-layer by heating, the improvement wherein a laser device, capable of generating energy of a specified wavelength effective to produce a desired temperature in said under-layer, is used to generate, during a period of time of the order of or shorter than a melting time of the under-layer, said desired temperature, which is at least so high that in addition the particles of the ceramic material are at least partially compacted or at least partially sintered.

7. A method as claimed in claim 6, wherein the particles of the ceramic material are nanoparticles of $SiO_2$.

8. A method as claimed in claim 6 wherein the synthetic resin is polypropylene or polyethylene.

* * * * *